United States Patent [19]
Takahashi

[11] Patent Number: 5,504,317
[45] Date of Patent: Apr. 2, 1996

[54] OPTICAL READER

[75] Inventor: Tooru Takahashi, Hatogaya, Japan

[73] Assignee: Opticon, Inc., Orangeburg, N.Y.

[21] Appl. No.: 177,422

[22] Filed: Jan. 5, 1994

[51] Int. Cl.$^6$ .................................................. G06K 7/10
[52] U.S. Cl. ........................................ 235/462; 362/32
[58] Field of Search .................................. 235/455, 462, 235/472; 250/553; 362/237, 257, 31, 32

[56] References Cited

U.S. PATENT DOCUMENTS

| | | | |
|---|---|---|---|
| 4,516,017 | 5/1985 | Hara et al. | 235/455 X |
| 4,734,566 | 3/1988 | Senda et al. | 235/455 |
| 4,743,773 | 5/1988 | Katana et al. | 250/566 |
| 4,818,847 | 4/1989 | Hara et al. | 235/455 |
| 4,935,609 | 6/1990 | Wike, Jr. | 235/472 |
| 4,983,817 | 1/1991 | Dolash et al. | 235/455 X |
| 5,028,770 | 7/1991 | Miyazaki et al. | 235/462 |
| 5,280,161 | 1/1994 | Niwa | 235/462 |

FOREIGN PATENT DOCUMENTS

62-166478  7/1987  Japan .................................. 235/455

Primary Examiner—Donald Hajec
Assistant Examiner—Michael G. Lee
Attorney, Agent, or Firm—Henry Schanzer

[57] ABSTRACT

In an optical reader a lens system is located between a source of light designed to illuminate an object to be read and the object. The lens system is designed to refract and diffuse the light produced by the light source to reduce the deleterious effect of specular light reflected from the illuminated object into the optical reader and an image sensor designed to convert reflected photo signals into electric analog signals. In one embodiment of the invention the optical reader includes an array of LEDs and a lens having prisms located in front of each LED for refracting or bending the light output of each LED to reduce the generation of specular light being reflected. In another embodiment the optical reader includes a lens with a light shield strip to prevent the generation of specular light.

18 Claims, 7 Drawing Sheets

-- DISTORTED WAVEFORM DUE TO SPECULAR REFLECTION

OPTICAL READER

BACKGROUND OF THE INVENTION

This invention relates to an optical reader and, in particular to an improved optical reader which is relatively unaffected by "specular" light; where the effect of "specular" light arises when a light beam is projected on a mirror like surface and is reflected back.

Known optical reading devices are designed to project light onto an object containing information and to read or sense the light reflected from the object. The object may be any one of a large number of products and the information may be any type of information such as, for example, a bar code or alphanumeric information. Typically, the reader includes a light source and means for projecting light from the light source onto the object and light reflected from the object is optically imaged onto an image sensor contained within the reader; where the image sensor is designed to convert the reflected light into electrical analog signals.

A problem with the prior art may be best illustrated by reference to FIGS. 1 through 4. FIG. 1 shows a light source 11 whose light output is projected via a radiating lens 12 onto an object 13 containing information to be read. The term "radiating" or "irradiating" lens as used herein refers generally to a cylindrical lens for projecting the light from the light source onto an object. Light reflected from the object 13 is projected through an aperture stop and via an imaging lens 15 onto an image sensor 17. The image sensor 17 may include a photodiode array coupled to a charge coupled device (CCD) which functions as a photodetector and is an optical to electrical analog signal converter. In FIG. 1, the reflected image projected onto the image sensor 17 is in response to "scattered" reflective light and not due to "specular" reflective light; "specular" light is light reflection from a mirror like surface. An information pattern read in response to "specular" light reflected onto image sensor 17 is not a correct indication (reflection) of the information pattern contained on the object.

However, known optical readers such as bar code readers can receive strong specular light reflected from an object being read via the optical path between the object 13 and the image sensor 17 as shown in FIG. 2. This is illustrated in FIG. 2 where the light 14 is incident on object 13 at an angle $\Theta_2$ such that it produces a reflected light beam 16 which represents a mirror like reflection denoted as specular reflective light. The reflection of specular light depends on the angle position at which the reading device is held relative to the object 13 which contains information to be read. FIG. 3 shows a top view of light beams incident on an object and reflected back onto the image sensor 17.

It is evident that the direction of the specular light reflected from an object varies as a function of the angle of the illuminating light incident on the information material. Therefore depending upon the angle of the incident illuminating light, strong specular light may be reflected along the optical light path imaged onto the image sensor. A high degree of "specular" reflective light imaged onto the image sensor significantly interferes and/or prevents the reading of the "correct" information available from the "scattered" light reflected back onto the image sensor.

The reflection of "specular" light occurs when the illuminating lens and the aperture stop coincide with two focus points of an ellipse and the reflective point coincides with the tangential line at a point of the ellipse.

Therefore, light incident on an object over a certain range of angles and reflected from the object with mirror like qualities onto the image sensor results in incorrect readings. The range of angles over which incorrect readings are obtained due to "specular" reflection is called the "dead zone". The "dead zone" depends on the angle position at which the reading device is held relative to the information pattern. FIG. 4 shows a bar code. Waveform B of FIG. 4 shows the waveforms produces at the output of an image sensor 17 when "scattered" light is reflected to the sensor. Waveform C in FIG. 4 illustrates the problem when the reader is reading the bar code A and the angle of the reader relative to the bar code being read is such that "specular" light is reflected back. Note that as shown in waveform C the information from two bars of the code are lost. This is a significant problem which exists with known optical readers and with known bar code scanners.

In many optical readers, several light emitting diodes (LEDs) and a radiating lens are used in an attempt to project uniform illumination onto the object or material to be read. The several LEDs are aligned or arranged in a row and, each LED functions as a point source of light. However, if one of the LEDs is not functioning or the light from that LED is not properly projected onto the object, the illumination will be uneven and non-uniform. When an optical information pattern such as bar code or an alphanumeric character recorded on a label or other material, is illuminated non-uniformly, the optical information will not be read accurately. This is another problem associated with known optical readers.

Furthermore, there exists non-uniform light energy passing through the aperture and imaging optics which is another problem present with known optical readers.

An object of this invention is to eliminate specular reflective light in the light path between the information material to be read and the image sensor located in the information reading device.

Another object of the invention is to compensate for the uneven and/or non-uniform illumination of the information material to be read.

A still further object of the invention is to compensate for the non-uniform light energy passing through the aperture and imaging optics in the information reading device.

SUMMARY OF THE INVENTION

Optical readers embodying the invention include a radiating lens, located between a light source and an object to be illuminated, with the lens being processed for projecting light from the light source onto the object such that "specular" light is not reflected back from the object.

In a particular embodiment, an optical reader according to the invention includes a housing in which there is mounted a light source comprised of an array of light emitting diodes (LEDs) and a radiating lens mounted between the light source and an opening or window on the housing. The radiating lens refracts and diffuses the light emitted out of the window and projects the light onto an object to be read. The radiating lens is designed such that regardless of the angle of the light incident on the object there is little, if any, specular light reflected back into the reader.

In one embodiment, the light source is an LED array composed of several light emitting diodes (LEDs) spaced apart and aligned in a row and each LED functions as a point source of light. The radiating lens formed of plastic, glass, or other transparent material extends for the length of the LED array and includes a prism associated with each LED, with each prism located in front of its corresponding LED, between its LED and the object being illuminated.

The prism may be an integral part of the lens, with the lens being cut and shaped in the region located opposite the LED to provide requisite properties of refraction and diffusion. The prism may include a plurality of microprisms (or subsections) with each microprism being shaped to present an angled surface to the incident LED light. The shape of the microprisms cause the light to bend within the prism region. In a preferred embodiment the prisms are designed and arranged to cause the light within the lens system, to bend towards the center of the lens system and the light projected out of the lens system to bend away from the center of the lens to provide relatively uniform illumination and to give rise to little, if any, "specular" reflective light.

DETAILED DESCRIPTION OF THE INVENTION

Figure 5:
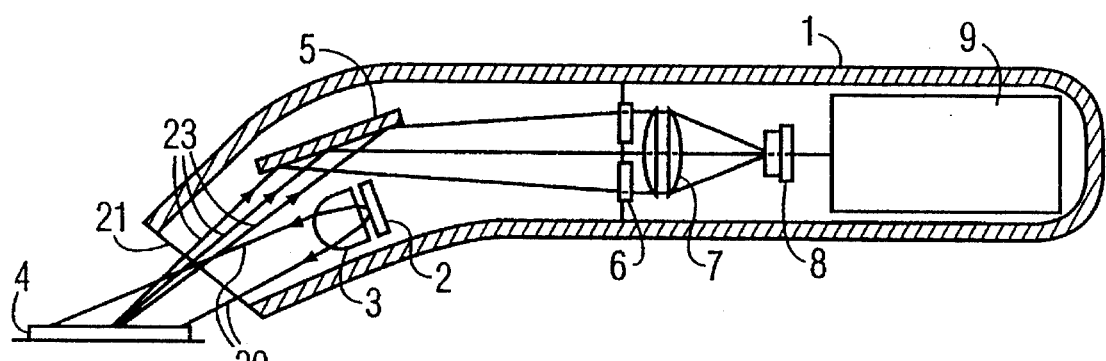
FIG. 5: Is a cut away cross section view of a bar code scanner embodying the invention.
Figure 6:
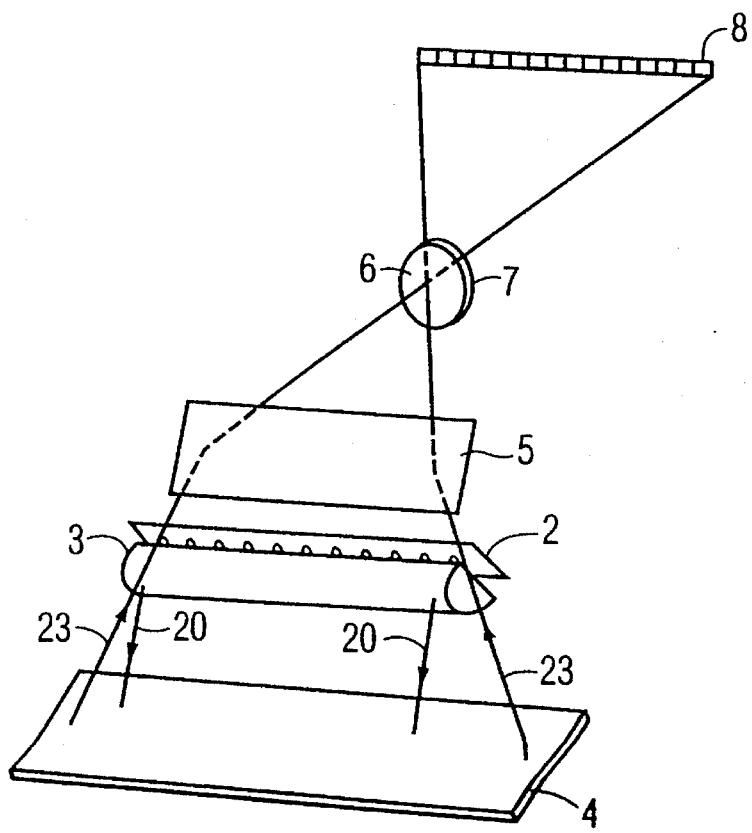
FIG. 6: Is a diagram of an optical path of the embodiment of FIG. 5.

FIG. 5 shows a cross section of a bar code scanner (reader) embodying the invention and FIG. 6 illustrates the optical path of the scanner. The bar code scanner of FIG. 5 includes a housing 1 in which is mounted a light source 2 used to illuminate a bar code carrier 4 which may be, for example, a label or any medium or material to which is affixed a bar code; where a bar code includes a number of parallel black and white bars of different widths and spacing. As is known in the bar code reading art, determining the number of bars, their widths and the spacing between the bars is critical to determining the type of bar code and the information contained in a particular bar code pattern.

Figure 7B:
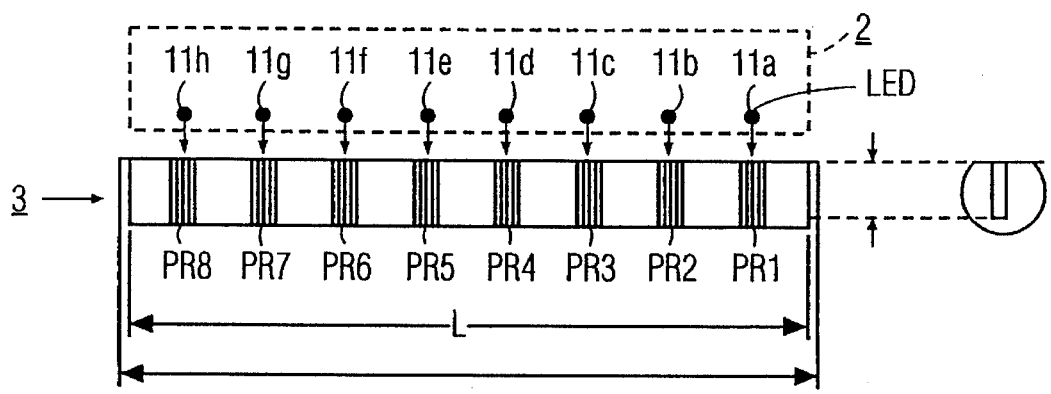
FIG. 7B: Is a diagram looking at the back of a radiating lens for preventing specular reflective light suitable for use in scanners embodying the invention.
Figure 8:
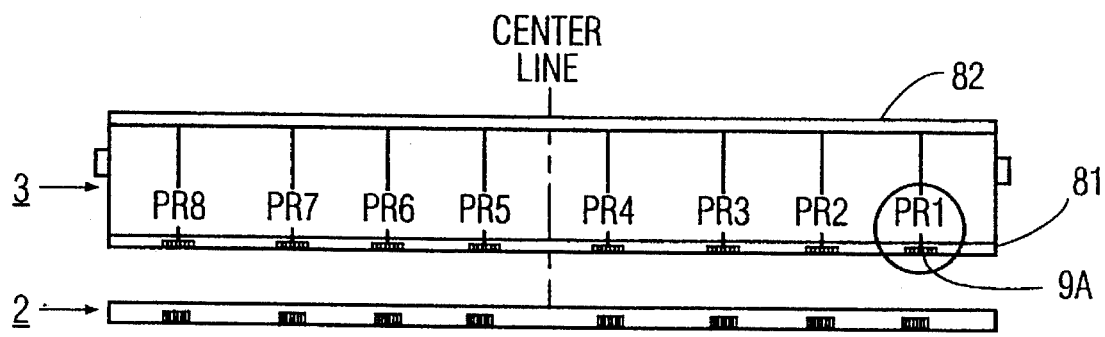
FIG. 8: Is a top view of the lens of FIGS. 7A and 7B.

Light source 2 used to provide the incident illumination 20 may comprise, for example, a plurality of light emitting diodes (LEDs) aligned or arranged in a row to permit the emitted light 20 to be projected and illuminate material to be read. Each LED, as noted above, corresponds to a point source of relatively intense light. In FIGS. 7B and 8, the LED array light source 2 is shown to be made and to include 8 LEDs. However, it should be evident that more (or less) LEDs may be used in scanners embodying the invention.

As shown in FIGS. 5 and 6 a diffusing and radiating lens 3 for refracting (and defracting) the light is located in front of the light source 2 to project the light 20 via an opening or window 21 located at the front (left in FIG. 5) of the housing. As shown in FIG. 6 (and FIG. 7B) the lens 3 extends for the length of the photodiode array 2. In systems embodying the invention, and as detailed below, the lens 3 modulates, refracts and bends light so projected and incident on the object 4 to prevent specular light from being reflected back from the object 4 into the housing and onto the image sensor.

Figure 1:
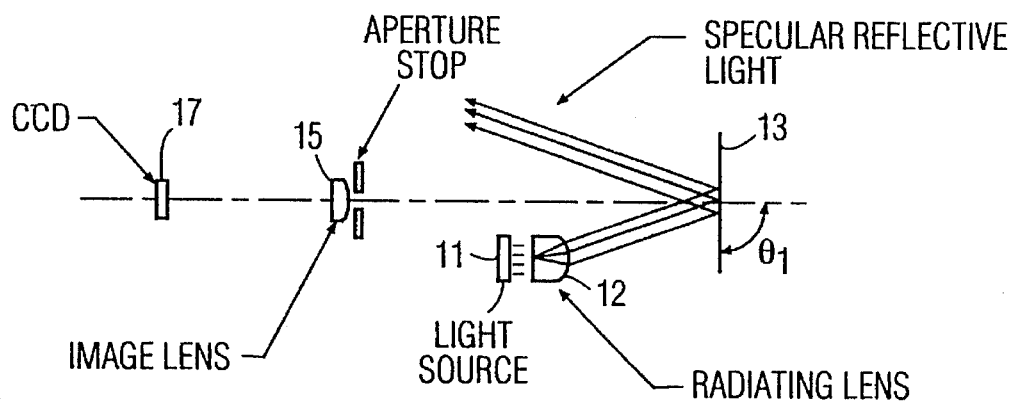
FIG. 1: is a side view of the light path of a conventional optical reader when sensing "scattered" reflected light (i.e, correctly used)
Figure 2:
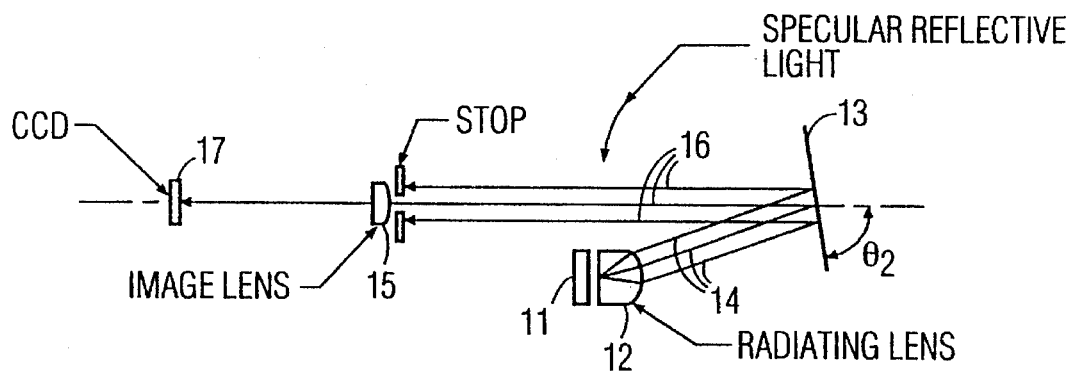
FIG. 2: is a side view of the light path of a conventional optical reader when sensing "specular" reflected light (i.e., erroneously used)
Figure 3:
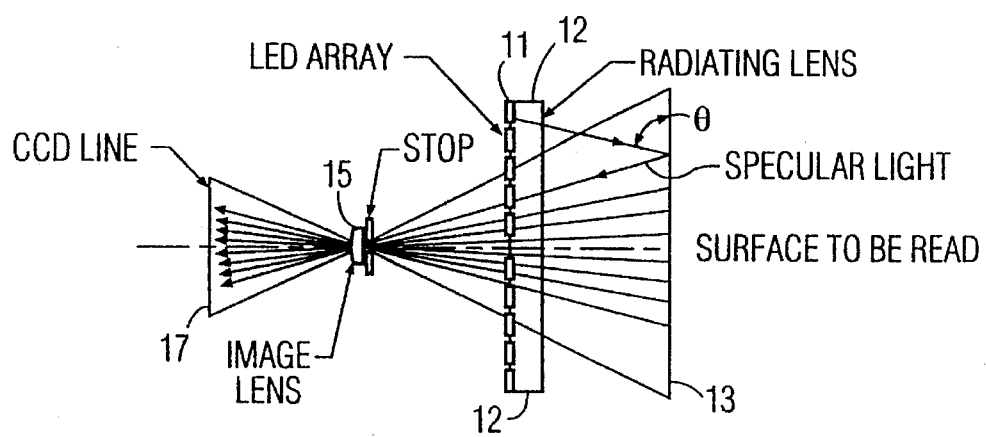
FIG. 3: is a top view of the light path of a conventional optical reader when sensing" specular" reflected light.
Figure 4A:
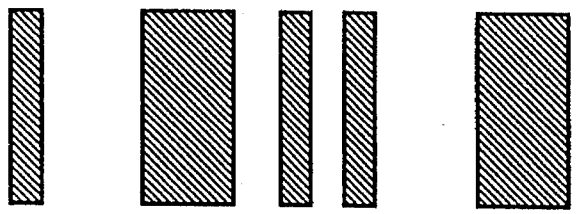
FIG. 4: is a diagram of bar codes and waveforms produced in response to "scattered" reflected light and "specular" reflected light.
Figure 4B:
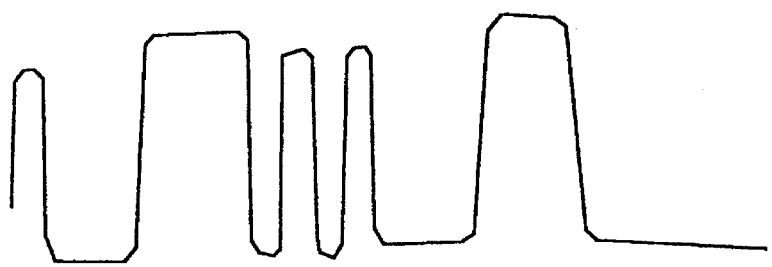
Figure 4C:
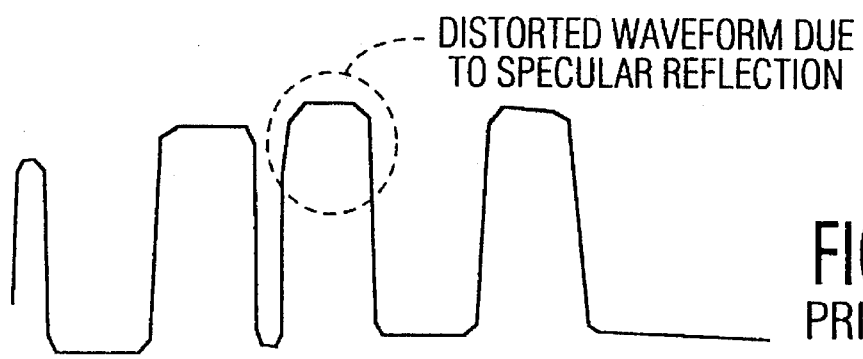

As shown in FIGS. 5 and 6, light 23 reflected from the object 4 is imaged on a reflective mirror 5 located near the top of the housing. The mirror 5 is used to redirect or reproject the reflected image light via an aperture stop 6 onto an imaging lens system 7 located behind the aperture stop 6. Lens system 7 focuses the reflected light onto an image sensor 8 which is coupled to signal processing circuitry 9. The image sensor 8 may be, for example, a photodiode array combined with a charge coupled device (CCD) register which converts the photo image into electrical analog signals, as shown in waveforms B and C of FIG. 4. The image sensor 8 may be any one of a number of suitable "CCD type" image sensors. The signal processing circuitry 9 is used to analyze the information read and may cause repeated readings of the information pattern to ensure a good read. The processing circuitry 9 may take many different forms known in the art.

Figure 7A:
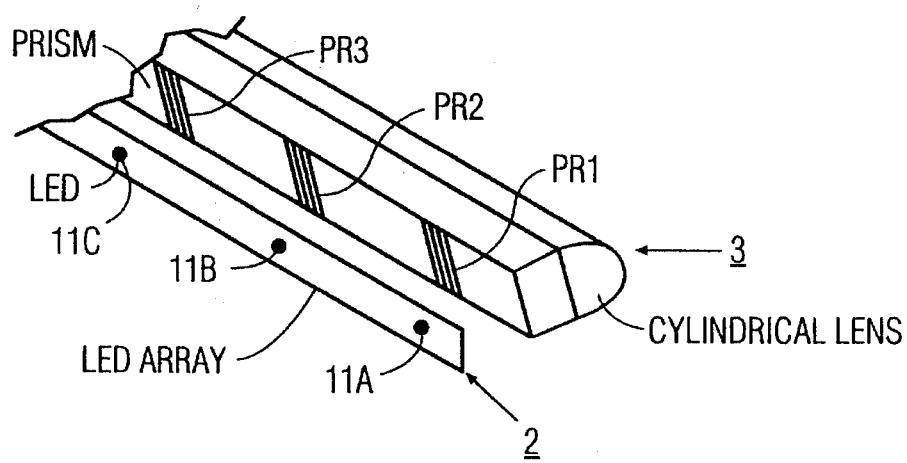
FIG. 7A: Is an isometric view showing the physical relationship of a light source (2) and a radiating lens (3)

FIG. 7A shows isometrically 3 elements of LED array 2 and that each LED is positioned such that its light output impinges and is incident on a corresponding "prism", shown as a black stripe located at the rear of the lens 3.

FIG. 7B shows the back side of the lens facing the LEDs with a slice taken through the lens 3. For ease of illustration 8 LEDs, one per prism, are shown above the prisms. However, in practice the associated LEDs would physically be mounted in back of the lens as shown in FIG. 7A. FIG. 7B shows 8 LEDs mounted in a row and a lens 3 extending for a length L to span the linear spread of the LEDs. As further detailed in FIGS. 8 and 9, the lens 3 is processed (machined, molded or cut) to form a prism section (PR1 through PR8) corresponding to each LED, with each prism section located to pass the light of its associated diode to limit the generation of specular reflective light. In FIGS. 7A and 7B the processed prism sections (PR1–PR8) are illustrated by dark vertical lines. In one embodiment the lens 3 is cylindrical, as shown in FIGS. 6 and 7A with its flat back side facing the LEDs and its cylindrical surface facing the object to be illuminated. So formed the lens 3 provides the advantages of focusing the light along one axis and the benefits of significantly reducing (if not eliminating) the problem of "specular" reflection.

FIG. 8 is a top view of the lens 3 of FIGS. 6, 7A, and 7B and shows various sections of the lens 3. Note that there is a clear section between each prism. The lens 3 as noted above may be formed of any known transparent material.

Figure 9:
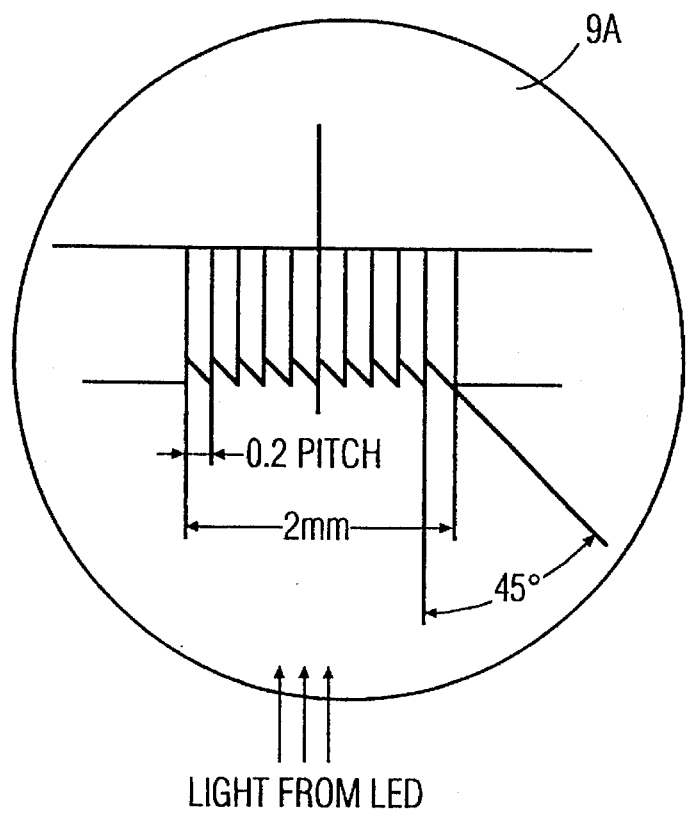
FIG. 9: Is an enlarged view of one of the prisms identified in FIGS. 7A, 7B, and 8.

FIG. 9 is an enlarged view up of a prism detailing that each prism is formed of many sub-prisms or "microprisms".

Figure 10A:
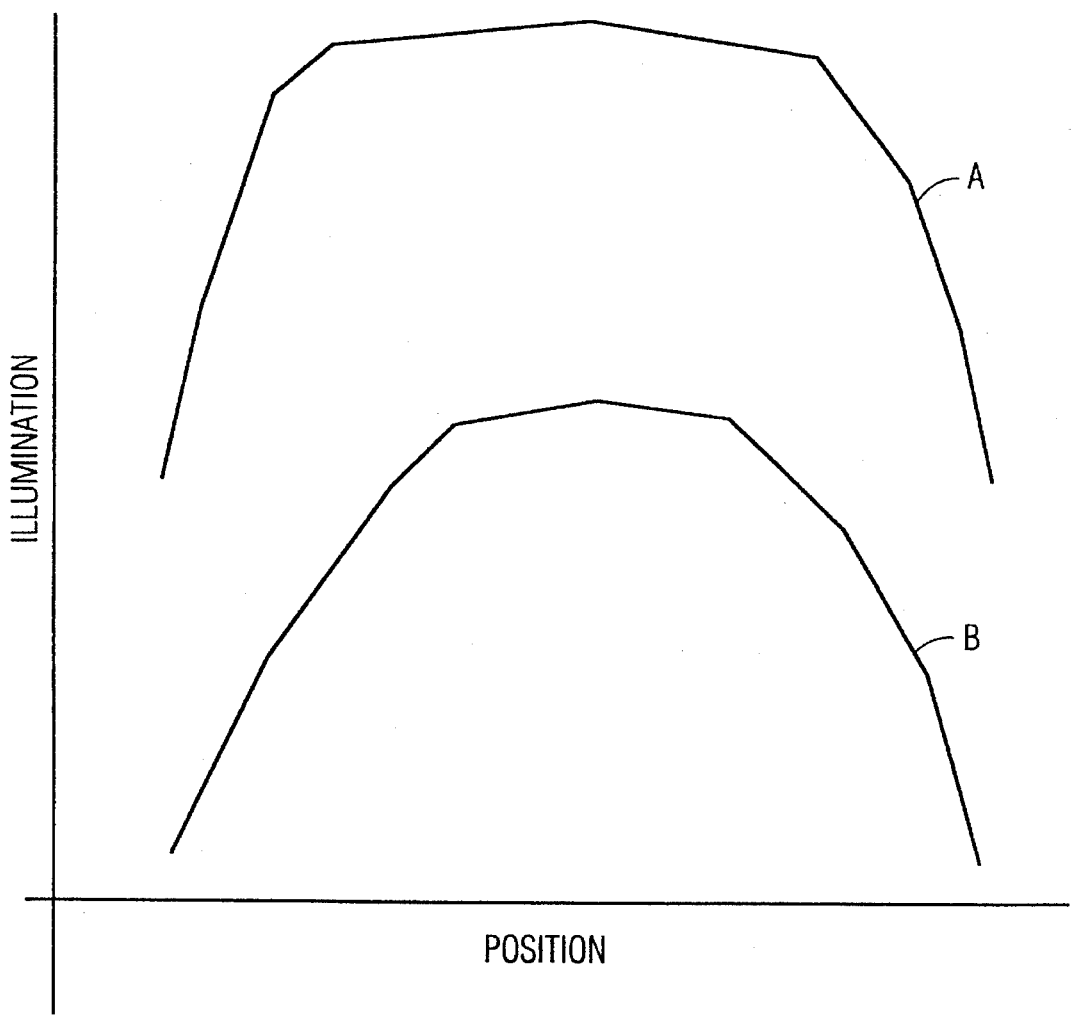
FIG. 10A: Is a diagram showing waveforms of projected light with and without the invention.
Figure 10:
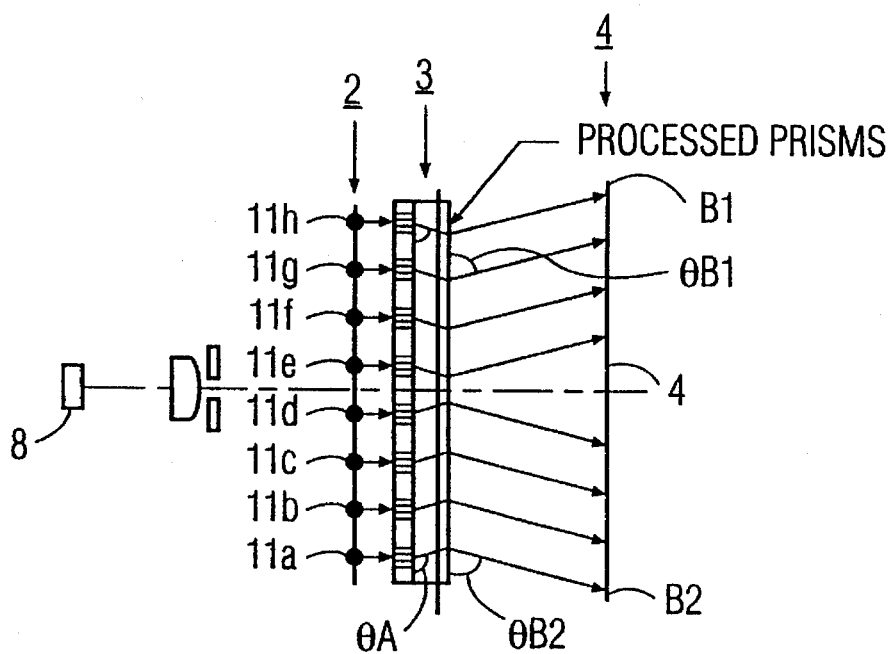
FIG. 10: Is a diagram illustrating the refraction and diffusion of light using a lens system embodying the invention.

FIG. 9 shows that light from an LED impinges on the microprisms. The light is refracted through the microprisms of each prism and the lens and is then projected onto an object. FIG. 10 shows how the microprisms cause the light to bend at one angle $\Theta_A$ through the prisms and then to bend at another angle $\Theta_B$ as the light is projected outward from the radiating lens 3 onto an object 4.

Note that in FIG. 9 the prisms (PR1–PR8) are shown to consist of ten (10) microprisms (i.e., sections). The number of sections can be increased or decreased (i.e., a greater number of microprisms sections can be formed or for purpose of economy fewer may be formed). In FIG. 9 the microprism are shown to be formed so as to present an angle of forty-five (45) degrees to the incident LED light. This angle was found to provide satisfactory results. However, it should be understood that the microprisms may be formed presenting a range of different angle to the LED light being projected. In FIG. 9 each prism is shown to have ten sub-sections, each sub-section being 0.2 mm wide, with each sub-section being cut at an angle of 45° relative to the back plane. Thus, in FIG. 9, each prism has 10 sawtooth like structure cut or formed at an angle of 45° degrees. The effect of this angled surface on modifying the path of the light beams coming from the LEDs is best described by reference to FIG. 10.

Each section of the processed prism is, as shown in FIG. 10, arranged separately in one to one relationship with each piece of the point light source. The location of each piece of the processed prisms is, as shown in FIG. 10, at the crossing convergent point of the incident optical path to the image sensor 8, on which the specular reflective path is supposed to pass, and of the radiating lens. Therefore, when the processed prisms are installed at these crossing points, there does not exists any longer any specular reflective path along the reflective path to the image sensor 8.

Referring to FIG. 10 note that the microprisms are arranged such the LED light, within the lens system 3 is bent towards the center of the lens system 3. However the light coming out of the lens system 3 and projected towards the object 4 is bent away from the center (see angles $\Theta_{B1}$ and $\Theta_{B2}$) in FIG. 10. As a result, a more uniform illumination is projected on the object 4, in that the outer points (B1, B2) are more uniformly illuminated. Furthermore, more light is projected towards the outer points (B1, B2) of the information pattern on object 4. As a result of projecting light onto an object in accordance with the invention, there is little, if any, specular light produced and reflected back to interfere with the image sensor 8. The benefits of the invention in producing a more uniform illumination is shown in FIG. 10 A. Waveform A represents illumination obtained using a lens system in accordance with the invention. Waveform B represents illumination obtained without the benefit of the prisms.

The following is the overall function of the embodiment shown in FIGS. 7–10.

Light source 2 illuminates the material 4 to be read through radiating lens 3 for preventing specular reflective light from entry. A part of the scattered reflected light from the optical information pattern on the material 4 is reflected back through aperture stop 6 and image lens 7 to image sensor 8. For this embodiment the illuminating light from the light source 2 passes through lens 3 and illuminates the optical information pattern. Only a part of the scattered reflective light from the optical information pattern is reflected back to image sensor 8 through reflective mirror 5, aperture 6, and image lens 7. The specular reflective light is not reflected back.

The non-uniform illumination of the information material 4 may be compensated by controlling the refraction angle of the processed prisms and the non-uniform transparency of the image lens may also be compensated.

Figure 11:
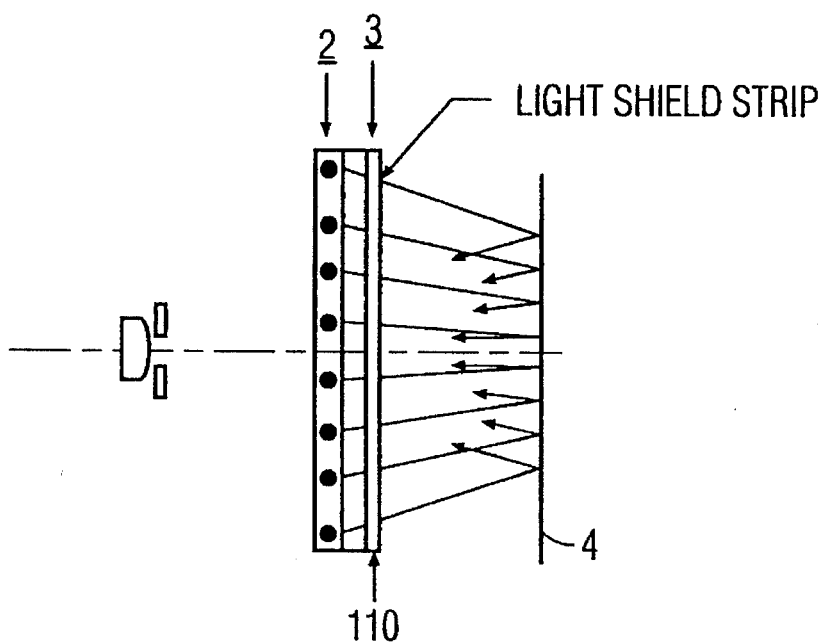
FIG. 11: Is a diagram of another type of radiating lens for preventing specular reflective light from being fed back to an image sensor.

Another embodiment for preventing specular light from being reflected back onto the image sensor is shown in FIG. 11.

FIG. 11 shows a light source 2 projecting a light radiating lens 3. In this embodiment a light shield strip 110 is installed or formed on the surface of the lens 3. The light shield 110 eliminates the specular reflective light from being fed back to the image sensor 8. In addition, the non-uniform illumination on the material to be read may be compensated by controlling the shield area of the shield strip, and the non-uniform transparency of the imaging lens 7 may also be compensated.

In FIG. 11 each light source irradiates at different (variable) angles and its specular reflective light passing through the aperture lens is limited to a very narrow area depending upon the dimension of the light source and the effective diameter of the aperture lens.

Therefore, the specular reflective light can be prevented from passing through the aperture lens by means of providing a light shield strip (piece) at the part on the aperture lens where the specular reflective light passes through.

This eliminates the specular reflective light on the reflective light path to the image sensor, and the reading accuracy of reader/scanner will not be influenced by its reading/scanning angle toward the object to be read.

What is claimed is:

1. In an optical reader having a housing in which is mounted a light source to illuminate material to be read and including optic means for projecting light reflected from the material onto an image sensor which converts reflected light from the material to electric analog signals; the improvement comprising:

a lens means located between said light source and the material to be read, wherein said lens means includes a number of prisms, each prism corresponding to a light source, each prism refracting the light from its corresponding light source, said lens means for adjusting the light projected onto said material to reduce the generation of specular light and its reflection back onto the image sensor.

2. The optical reader according to claim 1 wherein said lens means includes a light shield strip installed in an incident light path between said lens means and the material to be read.

3. In an optical reader according to claim 1 wherein said lens means includes means for providing a more uniform distribution of the light projected by said light source onto said material.

4. In an optical reader according to claim 1 wherein said light source includes an array of "M" light emitting diodes (LEDs); where M is an integer greater than one;

and wherein said lens means includes one prism corresponding to each one of said LEDs; and wherein each prism is located adjacent to and in front of its corresponding LED for refracting the light from its LED.

5. In the optical reader according to claim 4 wherein each prism is comprised of a multiplicity of microprisms, each microprism being cut at an angle to bend the light from the LED incident on the prism.

6. In the optical reader according to claim 5 wherein the prisms are arranged to bend the light incident from the LEDs towards the center of the lens means; and wherein the lens means is designed to cause the light, emitted from the lens means and projected towards the material to bend away from the center of the lens means.

7. An optical reader comprising:

a light source including an array of "M" light emitting diodes (LEDs); where M is an integer greater than one;

an optic system for projecting light emitted by said "M" LED's onto a surface to be illuminated external to said optical reader; said optic system including lens means having a prism corresponding to each one of said LEDs; and wherein each prism is located adjacent to and in front of its corresponding LED for refracting the light from its LED.

8. The optical reader according to claim 7 wherein each prism is comprised of a multiplicity of microprisms, each microprism being cut at an angle to bend the light from the LED incident on the prism.

9. The optical reader according to claim 8 wherein the prisms are arranged to bend the light incident from the LEDs towards the center of the lens means; and wherein the lens means is designed to cause the light emitted from the lens means and projected towards the surface to be illuminated to bend away from the center of the lens means.

10. The optical reader according to claim 7 wherein the surface of each microprism facing an LED is cut at a forty five (45) degree angle.

11. The optical reader according to claim 7 wherein each prism is comprised of a multiplicity of microprisms, each microprism being cut at an angle such that each prism presents a sawtooth pattern to the light incident from an LED.

12. The optical reader as claimed in claim 7 wherein the reader includes a housing in which the light source and the optic system are mounted said housing having a window with the optic system designed for projecting light through said window onto a surface to be illuminated and said window for receiving light reflected from said surface.

13. The optical reader as claimed in claim 7 wherein said LEDs are spaced apart and disposed along a row, and wherein said lens means is disposed in front of said LEDs, and extends for the length of the row in front of said LEDs, each prism being located in front of and adjacent to its corresponding LED.

14. An optical reader comprising:

an illuminating means including an array of "M" light sources; where M is an integer greater than one;

an optic system for projecting light emitted by said "M" light sources onto a surface, to be illuminated, external to said optical reader; said optic system including lens means having a prism corresponding to each one of said light source; and wherein each prism is located adjacent to and in front of its corresponding light source for refracting the light from its light source.

15. The optical reader as claimed in claim 14 wherein each one of said light sources is a light emitting diode (LED).

16. The optical reader as claimed in claim 15 wherein said surface includes a bar code comprising parallel stripes of different colors, and wherein said optical reader is a bar code reader.

17. The optical reader according to claim 14 wherein each prism is comprised of a multiplicity of microprisms, each microprism being cut at an angle to bend the light from the light source incident on the prism.

18. The optical reader according to claim 17 wherein the prisms are arranged to bend the light incident from the light sources towards the center of the lens means; and wherein the lens means is designed to cause the light emitted from the lens means and projected towards the surface to be illuminated to bend away from the center of the lens means.

* * * * *